United States Patent
Kober

Patent Number: 5,984,527
Date of Patent: Nov. 16, 1999

[54] OBLONG HOLE GUIDE BETWEEN TWO STRUCTURAL COMPONENT PARTS

[75] Inventor: Peer-Olaf Kober, Magstadt, Germany

[73] Assignee: DaimlerChrysler AG, Stuttgart, Germany

[21] Appl. No.: 09/127,793

[22] Filed: Aug. 3, 1998

[30] Foreign Application Priority Data

Aug. 2, 1997 [DE] Germany ............... 197 33 471

[51] Int. Cl.[6] ........................................ F16C 23/02
[52] U.S. Cl. ................... 384/192; 384/247; 384/519; 384/583
[58] Field of Search ..................... 384/192, 247, 384/428, 519, 583

[56] References Cited

FOREIGN PATENT DOCUMENTS

| 2 692 325 | 12/1993 | France . |
| 42 40 079 | 6/1994 | Germany . |
| 296 22 205 | 4/1997 | Germany . |

OTHER PUBLICATIONS

Vogel–Verlag, 1990, pp. 14 and 36 entitled "konstruktionselemente" (1990).

*Primary Examiner*—Lenard A. Footland
*Attorney, Agent, or Firm*—Evenson, McKeown, Edwards & Lenahan, PLLC

[57] ABSTRACT

An oblong hole guide is provided between two structural component parts of which the first, guiding structural component part has an oblong hole in which a guide bushing can glide in an adjustable manner transverse to its longitudinal axis, and which is fastened to the second, guided structural component part with the help of a bolt that penetrates it longitudinally. The bolt is anchored in the thread bore which is inserted into the guided structural component part. The hole guide is designed in such a manner that an easy adjustment is guaranteed without a bending out of line between the structural component parts, even in case of greater angular tolerances among the corresponding elements, by having the bolt penetrate the guide bushing with radial play, the thread bore is groove and an axial end of the guide bushing, which is supported by the guided structural component part, is externally chamfered and penetrates the groove area of the thread bore.

16 Claims, 1 Drawing Sheet

OBLONG HOLE GUIDE BETWEEN TWO STRUCTURAL COMPONENT PARTS

BACKGROUND AND SUMMARY OF THE INVENTION

This application claims the priority of German Application No. 197 33 471.7, filed Aug. 2, 1997, the disclosure of which is expressly incorporated by reference herein.

The invention relates to an oblong hole guide between two structural component parts.

Such an oblong hole guide is used to make possible a guided, bi-directional adjustment and/or shift between two structural component parts. In order to attain as exact a guide as possible, a relatively insignificant amount of play is built-in between the oblong hole and the guide bushing located within the hole. When, on the basis of angular or production tolerances, the external sides of the guide bushing do not run parallel to the internal sides of the oblong hole which face them, then a bending out of line can occur, resulting in the fact that the oblong hole guide makes possible only a sluggish adjustment of the structural component parts with respect to each other.

Angular deflections between the external sides of the guide bushing and the internal side of the oblong hole which face the external guide bushing sides can occur, for example, (1) when the thread bore is not formed vertically to the guided structural component part, (2) when the axial end of the guide bushing, which is supported by the guided structural component part, does not extend at a right-angle to the external side of the guide bushing or, respectively, its longitudinal axis, or (3) when the internal sides of the oblong hole do not run at right-angles to the upper or underside of the structural component part. A misalignment of the angles can also occur when the structural component parts, which are adjustable to each other via the oblong hole guide, are arranged inclined to one another.

The present invention is concerned with the problems of designing an oblong hole guide of the above-mentioned type such that it guarantees, even at greater angular tolerances among the respective elements, an easily moving adjustment between the structural component parts without bending them out of line.

The present invention solves these problems by providing an oblong hole guide between two structural component parts of which a first, guiding structural component part has an oblong hole in which a guide bushing can slide in an adjustable manner transverse to its longitudinal axis and which is fastened to a second, guided structural component part with the help of a belt that penetrates the guide bushing longitudinally. The bolt is anchored in a thread bore which is inserted into the guided structural component part. The bolt penetrates the guide bushing with radial play. The thread bore has an indentation. An axial end of the guide bushing, which is supported by the guided structural component part, is externally chamfered and penetrates the indented area of the thread bore.

The invention is based on the general concept of creating an oblong hole guide whose guide bushing can be adjusted when it is attached to the guided structural component part so that its external sides run parallel to the internal sides of the oblong hole which slide (glide) past them. In this manner, all angular deflection, which can otherwise lead to a bending out of line, can be compensated during the installation of the guide bushing so that the oblong hole guide, in accordance with the overall definition of the invention, makes it possible to achieve an easy adjustment between the structural component parts, without bending the components out of line or wedging them together.

In adjusting the longitudinal axis of the guide bushing parallel to the center longitudinal plane of the oblong hole, an incline can manifest itself between the longitudinal axis of the bolt and the longitudinal axis of the guide bushing. A guide bushing, which is designed in the usual way, whose face is supported by the guided structural component part and has a plane shape, would in this case make contact with the guided structural component part only in one place, along the circumferential edge of its face and could not be easily fastened by a bolt in this position.

In accordance with the present invention, the designed guide bushing's axial end, which faces the guided structural component part, is chamfered. During the fastening of the guide bushing, the chamfered end penetrates an indented or groove area of the thread bore of the bolt (screw, etc.). Depending on the orientation of the guide bushing, the guide bushing penetrates deeper in one area of the indentation than in the diametrically opposed one. During fastening of the bolt, the guide bushing is supported by the guided structural component part with its thread in the indentation. In this position, it can happen that the threaded end of the guide bushing becomes wedged and/or jammed between the indentation and the shaft of the bolt, which increases the setting of the guide bushing in this position.

The bolt penetrates the guide bushing with radial play so that the guide bushing can perform tipping (tilting) movements vis-à-vis the bolt shaft to adjust the guide bushing, with regard to its angle relative to the position of the internal sides of the oblong hole.

In a preferred embodiment, in particular as a result of the use of a spherically surface formed chamfer, the contact surface of the guide bushing in the chamfer is enlarged, whereby the relative position of the guide bushing is stabilized as a result of the fastening of the bolt.

A further advantageous development of the oblong hole guide prevents the guide bushing, which is attached to the guided structural component part, from moving out of the oblong hole, as the result of which the two structural component parts are attached to each other via the oblong hole guide, as defined by the invention. Additionally, in accordance with the present invention, a protruding rotary collar on the guide bushing ensures that the guiding structural component part does not come into contact with the head of the bolt, thus preventing a loosening of the bolt by means of contact with the adjacent structural component part.

Advantageously, the guide bushing is shaped such that the upper side of the collar is convex, in particular with a spherical surface form, as the result of which the application of force required for the fastening of the guide bushing can be improved.

With the help of a rectangular external cross-section of the guide bushing, a torsion of the structural component parts against each other is prevented.

In order to improve the application of force for the fastening of the guide bushing, in accordance with the present invention, the oblong hole guide has a convexly shaped underside of the bolt head, which rests on the guide bushing. In particular, a spherical surface form can be provided.

In a further development of the oblong hole guide according to the invention, the contact surface on which the guide bushing is supported by the indentation and/or by the guided structural component part is enlarged. In turn, as the result of this alignment, the position of the guide bushing, which is fastened inclined, is stabilized.

In a further advantageous development of the oblong hole guide, a torsional safety catch is provided to prevent spontaneous torsion of the bolt in the thread bore. The torsional safety catch is a ring-shaped plastic insert, which is positioned between the thread of the bolt and the thread of the thread bore when the bolt is bolted. It is thus possible to set the bolt in the guided structural component part, and simultaneously to guarantee an axial play between the guide bushing and the bolt or respectively its head. In this way, the guide bushing, which is fastened or respectively secured, remains adjustable in terms of its angle.

Other objects, advantages and novel features of the present invention will become apparent from the following detailed description of the invention when considered in conjunction with the accompanying drawings.

DETAILED DESCRIPTION OF THE DRAWINGS

Figure 1:
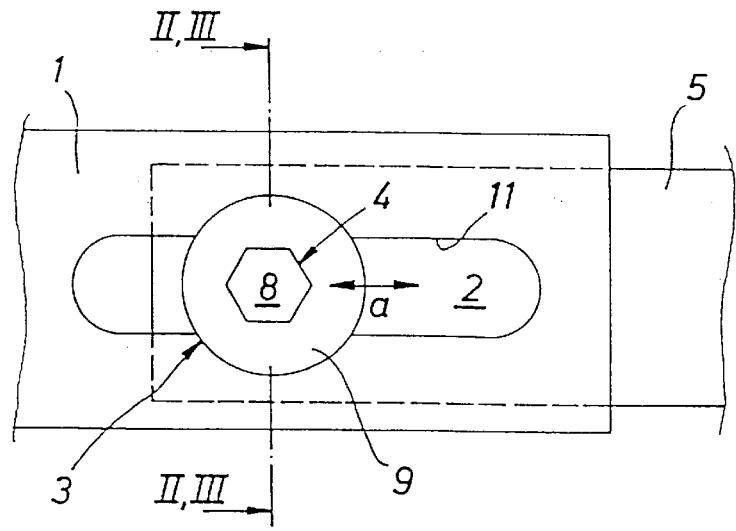
FIG. 1 is a plan view of an oblong hole guide.

Accordingly, FIG. 1 shows on an oblong hole guide a first structural component part 1 and an oblong hole 2 through which a guide bushing 3 is passed through in its longitudinal direction. The guide bushing 3 is fastened to a second structural component part 5 with the help of a bolt or screw 4, which is inserted through the guide bushing 3 in a longitudinal direction. The guide bushing 3 is bi-directionally movable in the oblong hole 2 in longitudinal direction (as shown by arrow "a"). In this manner, the structural component parts 1 and 5 are correspondingly adjustable with respect to each other as also shown by double arrow "a", whereby the adjustment movement is guided through the guide bushing 3 which is set into the oblong hole 2. The first structural component part 1, which contains the oblong hole 2, is the guiding structural component part 1 while the second structural component part 5, which is connected to the guide bushing 3, is the guided structural component part 5.

Figure 2:
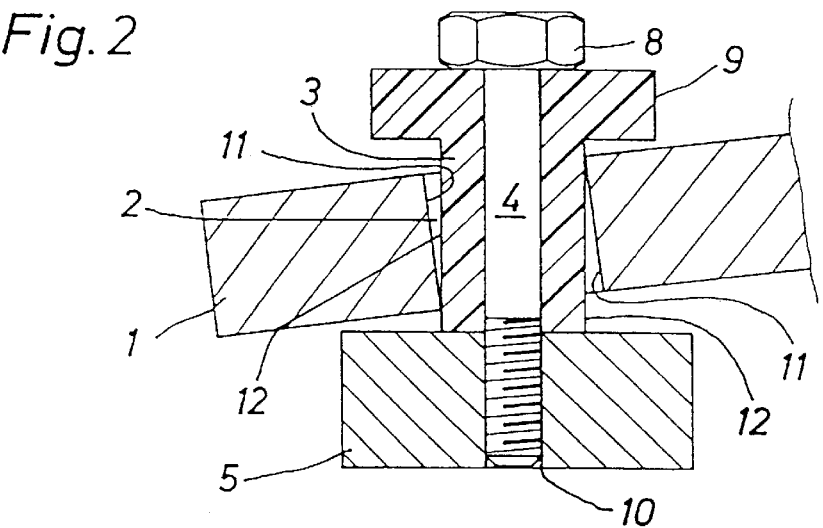
FIG. 2 is a sectional view taken along line II—II in FIG. 1, of an oblong hole guide in accordance with the prior art.

Because of production tolerances between the elements of the oblong hole guide which touch each other, or respectively between the structural component parts 1 and 5, an angular misalignment can occur. In this manner, according to FIG. 2, it may happen in a prior art oblong hole guide that the internal sides 11 of the oblong hole 2 of the guiding structural component part 1 are inclined with regard to the longitudinal axis of the guide bushing 3 or respectively its external sides 12. In particular, in case of little play between the external side 12 of the guide bushing 3 and the internal side 11 of the oblong hole 2, which is necessary for attaining a qualitatively high-grade guide, the guiding structural component part 1 may become wedged or be bent out of line vis-à-vis the guide bushing 3. This causes sluggishness in the movement of the oblong hole guide or possibly, to even block it entirely.

Figure 3:
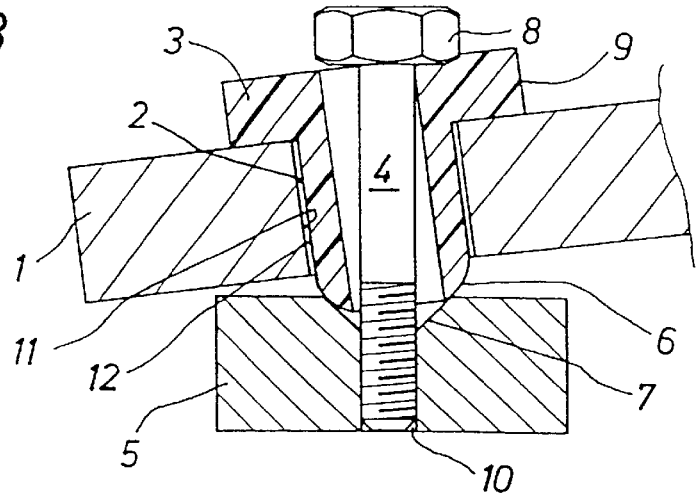
FIG. 3 is a sectional view take along line III—III in FIG. 1, of an oblong hole guide in accordance with the present invention.

Corresponding to FIG. 3, in accordance with the present invention, the internal diameter of the guide bushing 3 is bigger than the external diameter of the shaft of the bolt 4 which results in a radial play. In this manner, the guide bushing 3 can be tipped (tilted) vis-à-vis the bolt 4 so that the longitudinal axis of the guide bushing 3 runs at an incline vis-à-vis the longitudinal axis of the bolt 4. This angular adjustability of the guide bushing 3 makes it possible to align the guide bushing in terms of its angle to the position of the guiding structural component part 1 or respectively the oblong hole 2. FIG. 3 depicts such an alignment so that the longitudinal axis of the guide bushing 3 or respectively its external sides 12 runs parallel to the internal sides 11 of the oblong hole. In such a parallel alignment of the surfaces or respectively sides which glide past each other, the danger of either lodging or wedging the thus guided structural component parts is significantly reduced.

In order to be able to securely fasten the guide bushing 3 to the component part S in an inclined position vis-à-vis the bolt 4, the axial end of the guide bushing 3, which faces the guided structural component part 5, is chamfered 6. In the design example the chamfer is shaped in a spherical surface form. In addition, a thread bore 10, with which the bolt 4 is anchored to the guided structural component part 5, is grooved or indented. In the design example, this groove 7 is conically shaped. During the fastening of the bolt 4, the chamfer 6 penetrates the groove 7, which results in a relatively large support surface for the guided bushing vis-à-vis the guided structural component part 5, as the consequence of which the guide bushing 3 can be securely fastened even in an inclined position vis-à-vis the bolt 4. The situation can also arise wherein the chamfer 6 is pressed so far into the groove 7 in a certain area so that it becomes wedged between the groove 7 and the shaft of the bolt 4, as the result of which the stability of the setting of the guide bushing 3, which can be attained in this position, is increased.

In a special design form, the guide bushing 3 can be made of plastic. In this design, during the fastening of the bolt 4, the bolt head 8 can be pushed into or respectively can dig into the face end of the guide bushing 3 which faces the bolt head 8. In this manner a form-fitting connection is shaped between the bolt head 8 and the end of the guide bushing 3 which belongs to it. This improves on one hand the application of the locking forces for fastening the guide bushing 3 to the guided structural component part 5, and on the other hand it prevents a spontaneous torsion of the bolt 4.

The end of the guide bushing 3 facing the head of the bolt 8 possesses a radial, externally protruding collar 9 on which the head of the bolt 8 rests with its underside for fastening the guide bushing, in order to apply the fastening forces into the guide bushing 3. Hereby, the collar 9 overlaps areas of the guiding structural component part 1 which are adjacent to the oblong hole 2, whereby the guiding structural component part 1 cannot detach itself from the guided structural component part 5. In order to obtain an oblong hole guide which is as easily movable as possible, the length of the guide bushing 3 is chosen such that with regard to the guide bushing 3, an axial play can develop for the guiding structural component part 1, which is placed between the collar 9 and the guided structural component part 5, also when the guide bushing 3 is fastened in an inclined position toward the bolt 4 and the chamfer 6 (partly) penetrates the groove 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An oblong hole guide between two structural component parts of which a first, guiding structural component part has an oblong hole in which a guide bushing slides in an adjustable manner transverse to the guide bushing's longitudinal axis and which is fastened to a second, guided structural component part with a bolt that penetrates the guide bushing longitudinally, the bolt being anchored in a thread bore which is arranged in the guided structural component part, wherein the bolt penetrates the guide bushing so as to leave an amount of radial play, and further wherein the thread bore has a groove and an axial end of the guide bushing, which is supported by the guided structural component part, is externally chamfered and is arranged to penetrate the groove of the thread bore.

2. The oblong hole guide according to claim 1, wherein the external chamfer at an axial end of the guide bushing is one of conically shaped and of a spherical surface form.

3. The oblong hole guide according to claim 2, wherein an end of the guide bushing, opposite the chamfered end, is equipped with a radial, externally protruding rotary collar whose diameter exceeds a width of the oblong hole, wherein an axial length of the guide bushing is calculated such that there is axial play between the guiding structural component part and the facing underside of the collar when the guide bushing is fastened to the guided structural component part.

4. The oblong hole guide according to claim 1, wherein an end of the guide bushing, opposite the chamfered end, is equipped with a radial, externally protruding rotary collar whose diameter exceeds a width of the oblong hole, wherein an axial length of the guide bushing is calculated such that there is axial play between the guiding structural component part and the facing underside of the collar when the guide bushing is fastened to the guided structural component part.

5. The oblong hole guide according to claim 3, wherein the upper side of the collar is convex in its shape.

6. The oblong hole guide according to claim 5, wherein the convex shape has a spherical surface form.

7. The oblong hole guide according to claim 1, wherein the guide bushing has a rectangular external cross-section.

8. The oblong hole guide according to claim 1, wherein an underside of the bolt head, which rests on the guide bushing, is convex in its shape.

9. The oblong hole guide according to claim 8, wherein the convex shape has a spherical surface form.

10. The oblong hole guide according to claim 8, wherein the torsional safety catch is a ring-shaped plastic insert, which is positioned between the thread of the bolt and the thread of the thread bore when the bolt is bolted in.

11. The oblong hole guide according to claim 1, further comprising a torsional safety catch preventing a spontaneous torsion of the bolt in the thread bore.

12. The oblong hole guide according to claim 1, wherein the groove of the thread bore is one of conically shaped and of a spherical surface form.

13. A guide bushing for an oblong hole guide between two structural component parts of which a first, guiding structural component part has an oblong hole in which the guide bushing is slidable in an adjustable manner transverse to its longitudinal axis and which is fastened to a second, guided structural component part via a bolt which penetrates the guide bushing longitudinally, wherein the bolt is anchored in a thread bore arranged in the guided structural component part and penetrates the guide bushing with radial play, the thread bore having a groove, wherein an axial end of the guide bushing, which is externally chamfered, serves as a support on the guided structural component part.

14. An oblong hole guide between a first, guiding structural component part and a second, guided structural component part, the hole guide comprising:

an oblong hole arranged in the first structural component part;

a guide bushing arranged in the oblong hole to slide in an adjustable manner transverse to its longitudinal axis, the guide bushing having an axial end which is externally chamfered;

a bolt inserted through the guide bushing leaving an amount of radial play, the bolt being secured in a thread bore of the second structural component part, said thread bore having a groove at its surface;

wherein the externally chamfered axial end of the guide bushing penetrates the groove of the thread bore.

15. The oblong hole guide according to claim 14, wherein the externally chamfered axial end of the guide bushing has a conical shape.

16. The oblong hole guide according to claim 15, wherein the conical shape has a spherical surface form.

* * * * *